United States Patent [19]
Herrick, IV

[11] Patent Number: 5,664,489
[45] Date of Patent: Sep. 9, 1997

[54] FOOD BREADING APPARATUS

[75] Inventor: Harold Herrick, IV, Highland Village, Tex.

[73] Assignee: Dallas A.C. Horn & Co., Dallas, Tex.

[21] Appl. No.: 752,209

[22] Filed: Nov. 19, 1996

[51] Int. Cl.[6] .................. A23L 1/22; A47J 44/00; B05B 5/00; B05C 19/00
[52] U.S. Cl. .............. 99/494; 99/450.1; 118/19; 118/23; 118/312; 366/233; 366/234
[58] Field of Search ................ 99/494, 516, 534, 99/535, 450.1, 475; 118/13, 16, 17, 19, 20, 23, 24, 75, 308, 309, 312, 502, 418, 608; 209/288; 241/86, 88.4, 186, 35, 191; 366/232, 233, 234, 221; 426/518

[56] References Cited

U.S. PATENT DOCUMENTS

| | | | |
|---|---|---|---|
| 3,648,648 | 3/1972 | Johnson et al. | 118/19 |
| 3,735,726 | 5/1973 | Butler | 118/24 |
| 3,739,743 | 6/1973 | McKee, Jr. | 118/19 |
| 3,885,519 | 5/1975 | Orlowski | 118/16 |
| 4,458,586 | 7/1984 | Reed | 99/494 |
| 4,936,248 | 6/1990 | Miller | 118/312 X |
| 5,052,330 | 10/1991 | Stacy | 99/450.1 X |
| 5,133,278 | 7/1992 | Anderes | 118/19 |
| 5,195,454 | 3/1993 | Wadell | 118/312 X |
| 5,226,354 | 7/1993 | Stewart | 366/234 X |
| 5,236,502 | 8/1993 | Wadell | 99/494 X |
| 5,265,525 | 11/1993 | Stewart | 99/494 |
| 5,284,514 | 2/1994 | Griffiths | 118/23 |
| 5,514,399 | 5/1996 | Cordera et al. | 99/494 |

*Primary Examiner*—Timothy F. Simone
*Attorney, Agent, or Firm*—Michael A. O'Neil; Russell N. Rippamon

[57] ABSTRACT

A food breading apparatus for breading food components with a breading mixture includes a breading drum rotatable about its longitudinal axis wherein the longitudinal axis is inclined from horizontal. The drum includes an inlet opening located in an upper end, an outlet opening located in a lower end, and a plurality of openings located proximal to the lower end of a sidewall. The openings are sized to allow surplus breading mixture and lumps of breading mixture to pass therethrough but retain the breaded food product in the rotating breading drum. An inlet conveyor provides food components to be breaded to the inlet opening of the breading drum. A recirculating breading mixture conveyor provides the breading mixture to the inlet opening. A takeout conveyor moves the breaded food components from the outlet opening of the breading drum. A lump removal conveyor is positioned below the plurality of openings in the sidewall of the breading drum. The lump removal conveyor includes a plurality of openings sized to allow passage of surplus breading mixture therethrough but retain the lumps of breading mixture for transport to a catch pan.

14 Claims, 5 Drawing Sheets

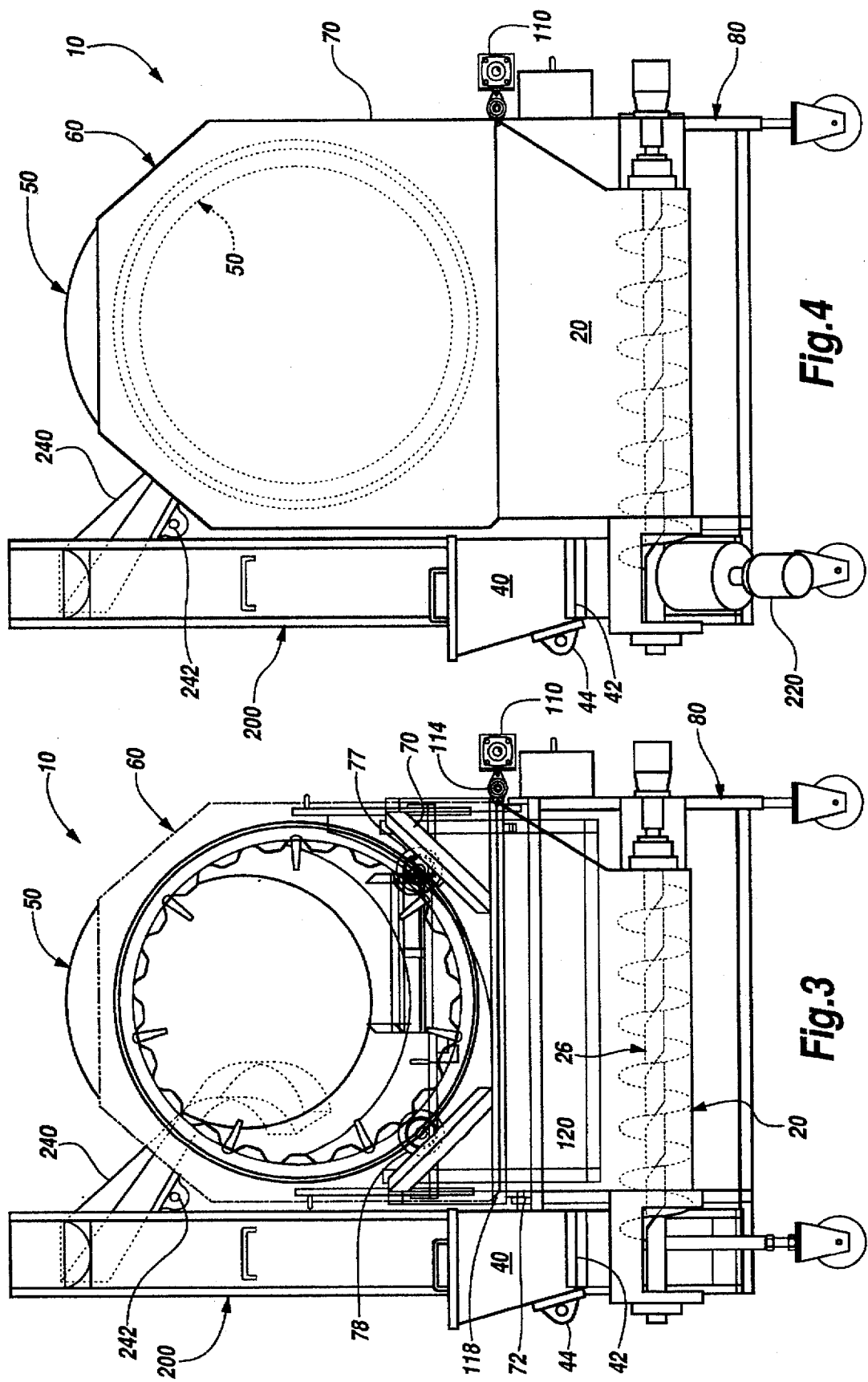

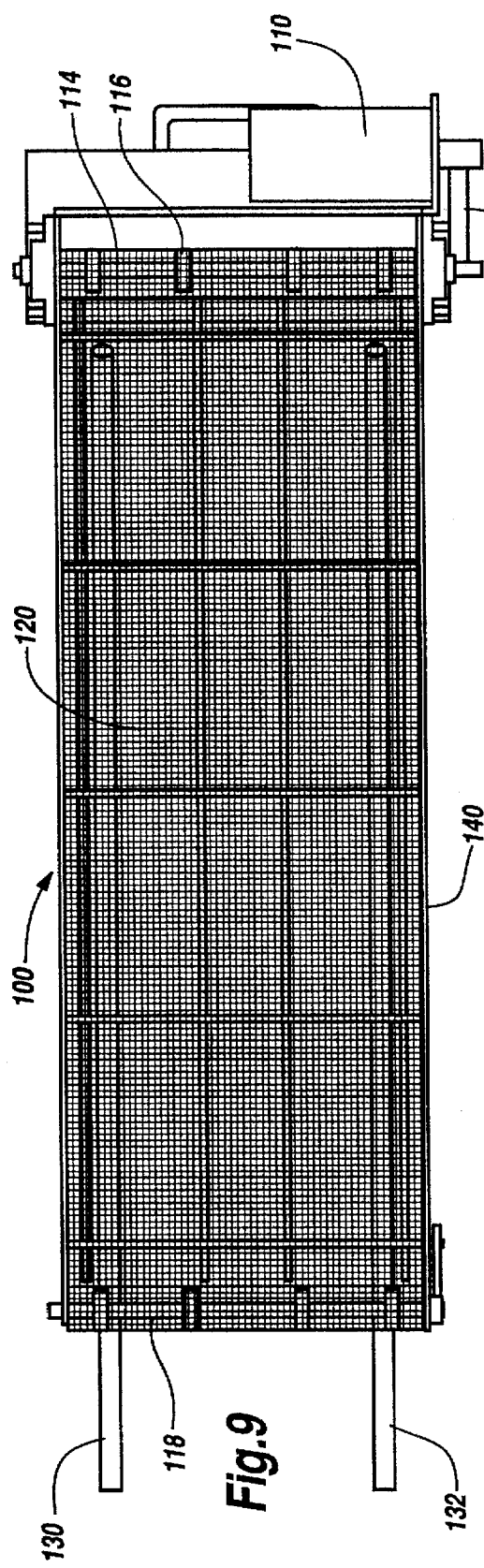
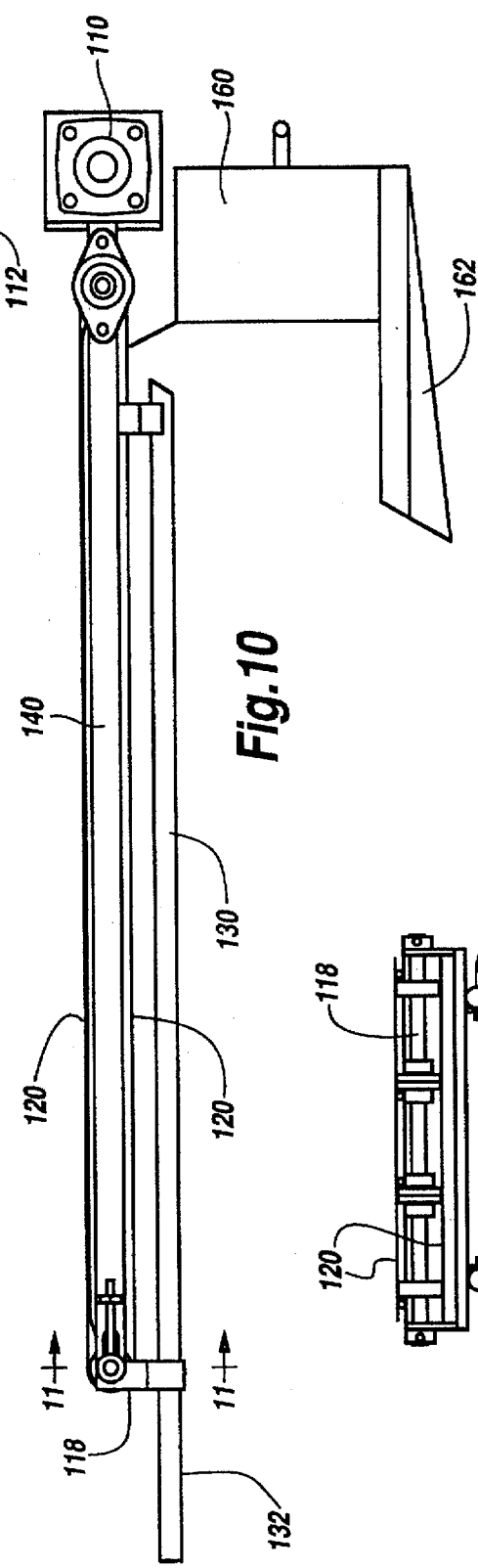
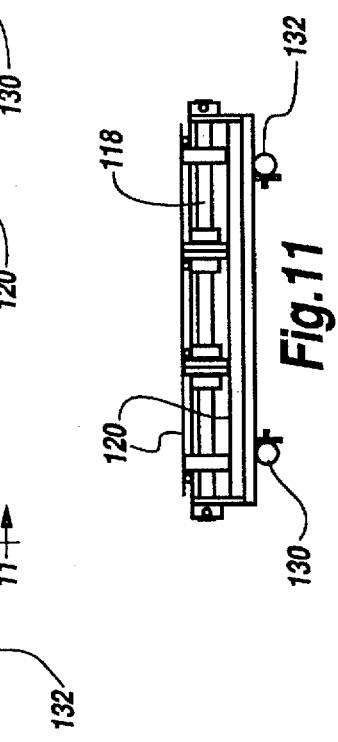

FOOD BREADING APPARATUS

TECHNICAL FIELD

This invention relates generally to food processing devices and, more particularly, to an apparatus for breading food products.

BACKGROUND AND SUMMARY OF THE INVENTION

Pre-prepared food products are much in demand by today's consumers. Food products that are pre-cooked and only require final heating before consumption are desired by both household consumers and commercial food establishments. Fried and oven baked foods especially those having a breaded coating are especially popular in the category of pre-prepared products.

Breaded food products were traditionally prepared individually by hand rolling the food product, for example a chicken breast, in a breading preparation. The breading preparation may be wheat flour or corn meal and spices. After the breading is applied, the food product is typically fried or baked.

Anyone who has breaded food products by hand can understand the time consuming and messy nature of the breading process. Prior attempts at mechanical breading apparatus have been largely unsuccessful. Prior art mechanical systems have incorporated drive systems and hydraulics in and around food containing components, thereby subjecting the food products to potential contamination. Additionally, prior art mechanical breading devices have been largely unsuccessful at removing lumps from the breading mixture. As the lumps are recirculated they continue to grow in size an ultimately pass with the breaded product to further food processing stations. If additional resources are not expended in subsequent sorting operations, the lumps of breading will be packaged with the final breaded product and delivered to the customer. Therefore, there exists a need for a quick, efficient and sanitary food breading apparatus capable of removing the lumps of breading mixture.

In accordance with the present invention, a food breading apparatus for breading food components with a breading mixture includes a breading drum rotatable about its longitudinal axis. A drum cradle supports the breading drum. The drum cradle is pivotally mounted to allow for adjustment of the inclination angle of the longitudinal axis of the breading drum from horizontal.

The drum includes an inlet opening located in an upper end, an outlet opening located in a lower end, and a plurality of openings located proximal to the lower end of a sidewall. The openings are sized to allow surplus breading mixture and lumps of breading mixture to pass therethrough but retain the breaded food product in the rotating breading drum.

An inlet conveyor directs food components to be breaded into the inlet opening of the breading drum. A recirculating breading mixture conveyor provides the breading mixture to the inlet opening. A takeout conveyor directs breaded food components away from the outlet opening of the breading drum. A lump removal conveyor is positioned below the openings in the sidewall of the breading drum. The lump removal conveyor includes a plurality of openings sized to allow passage of surplus breading mixture therethrough but retain the lumps of breading mixture for transport to a catch pan for disposition.

A surge hopper and conveyor positioned below the lump removal conveyor collects surplus breading mixture passing through the openings in the lump removal conveyor and transports surplus breading mixture to the recirculation conveyor. A metering hopper is mounted on the surge hopper and stores and dispenses non-recycled breading mixture into the surge hopper at a predetermined rate sufficient to equate to the rate breading mixture is leaving the breading apparatus on the breaded products and as removed lumps. The mixed non-recirculated and recirculated breading mixture passes into the recirculation conveyor wherein the cycle heretofore described begins again.

The present invention is superior to the prior art systems in that the drive motors and hydraulic systems are remotely located away from the food products, thereby avoiding potential contamination of the food products. Additionally, the breading drum, the lump removal conveyor, the input conveyor, the output conveyor, the recirculation conveyor and surge hopper are all independently driven. Such independent drivers provide versatility for operation of the various breading apparatus components.

Prior art food breading apparatus do not include a lump removal conveyor for removing lumps in the breading mixture prior to recirculation of the breading mixture. If the lumps are not removed they grow in size during successive recirculation and ultimately pass with the breaded product to further processing stations generating additional waste.

Prior art food breading apparatus also do not include a metering hopper. The metering hopper contributes to the improved quality and consistency of the breaded product by greatly reducing wide swings in moisture content of the breading mixture, thereby allowing consistent adhesion of the breading to the product and providing an even breading coverage and thickness.

BRIEF DESCRIPTION OF THE DRAWINGS

A more complete understanding of the present invention may be had by reference to the following Detailed Description when taken in conjunction with the accompanying drawings wherein:

FIG. 3 is an end section view of the food breading apparatus of FIG. 1 taken at section 3—3;

FIG. 4 is an end view of the food breading apparatus of FIG. 1;

FIG. 9 is a partial top view of a lump removal conveyor of the present invention;

FIG. 10 is a partial side view of the lump removal conveyor of FIG. 9; and

FIG. 11 is a partial end section view of the lump removal conveyor of the present invention taken at section 11—11 of FIG. 9.

DETAILED DESCRIPTION OF THE INVENTION

Figure 1:
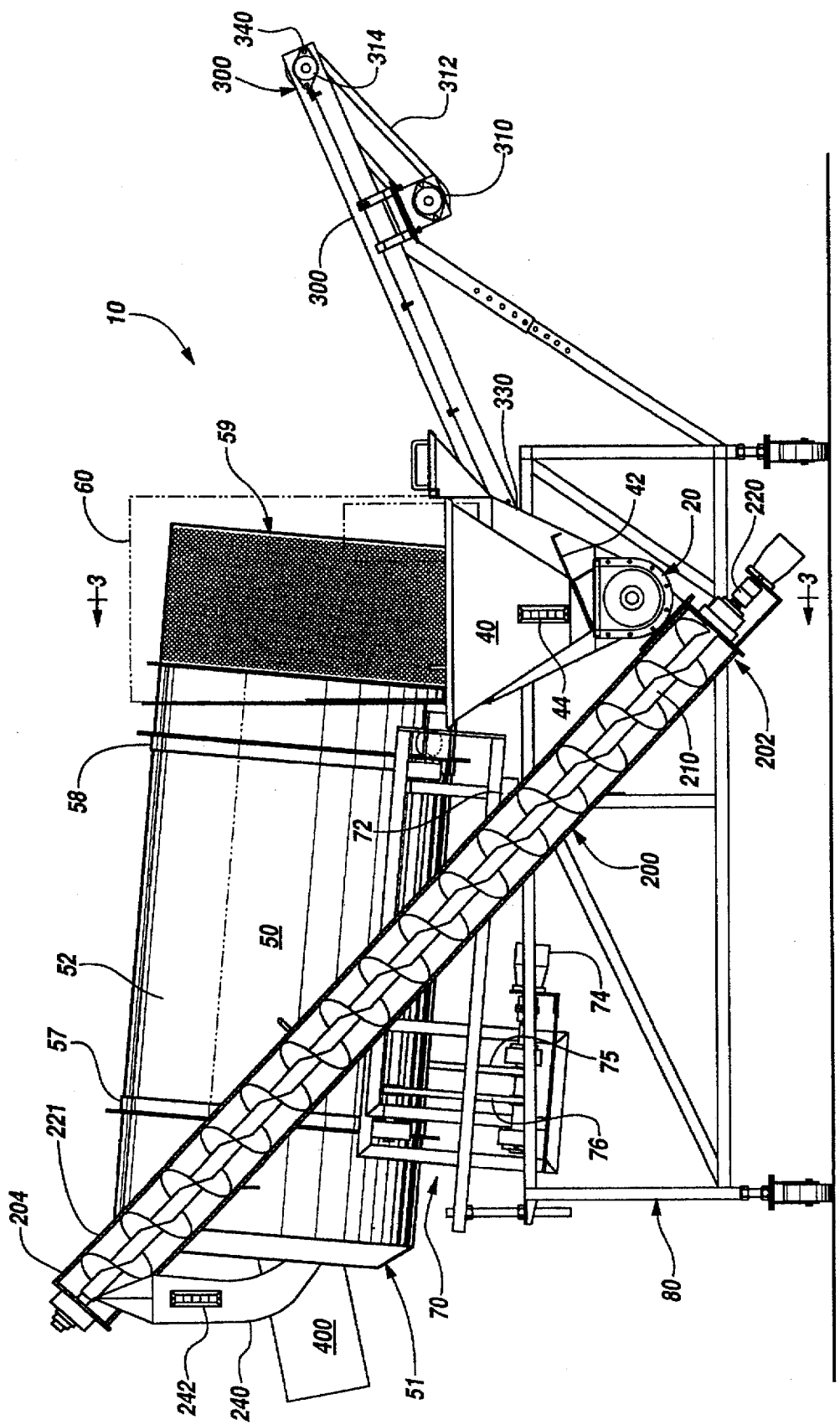
FIG. 1 is a side view of the food breading apparatus of the present invention.
Figure 2:
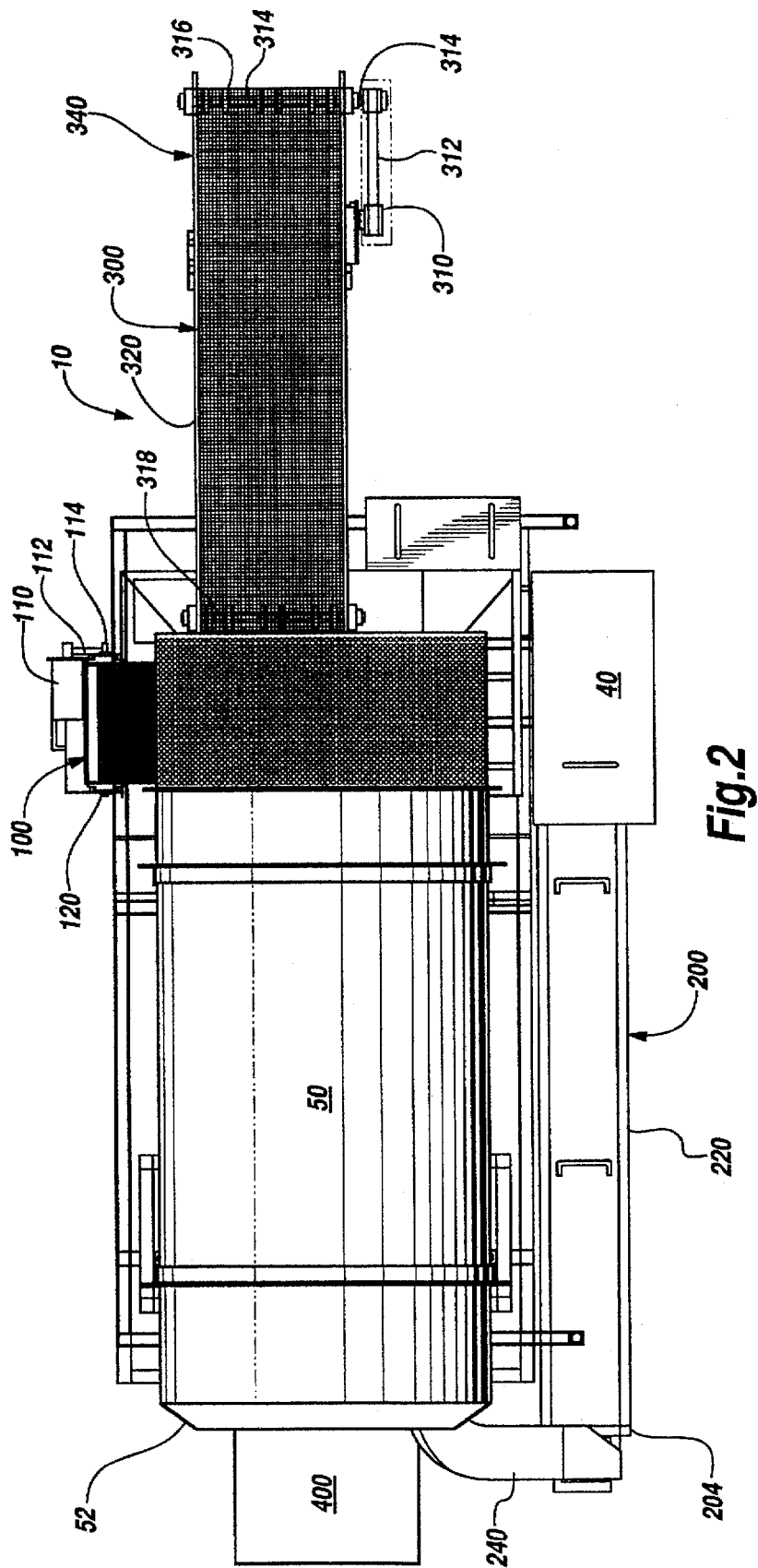
FIG. 2 is a top view of the food breading apparatus of FIG. 1.

Reference is now made to the Drawings wherein like reference characters denote like or similar parts throughout the FIGURES. Referring to FIGS. 1 and 2, therein is illustrated a food breading apparatus 10. The major components of the food breading apparatus include a breading mixture surge hopper 20, a breading mixture metering hopper 40, a breading drum 50, a containment shroud 60, a drum cradle assembly 70, a frame 80, a lump removal conveyor 100, a recirculation screw conveyor 200, input conveyor 400 and a takeout conveyor 300.

As used herein "breading mixture" is representative of any breading to be applied to the product to be breaded. A breading mixture typically includes a staple ingredient such as wheat flour, corn flour, corn meal, ground bread crumbs, or the like, or any combination of the above. Added to the staple ingredients are spices to impart any number of flavors to the end food product. It is to be understood that the above recitation of staple products and spices is not meant to be limiting but only illustrative of the basic components of a breading mixture.

As used herein "product to be breaded" is representative of any product to be breaded with the breading mixture in the breading apparatus of the present invention. Such products may include meats such as chicken, beef or pork and vegetables such as squash or okra. It is to be understood that the above recitation product is not meant to be limiting but only illustrative of the type of products that may be breaded by the present invention.

Figure 6:
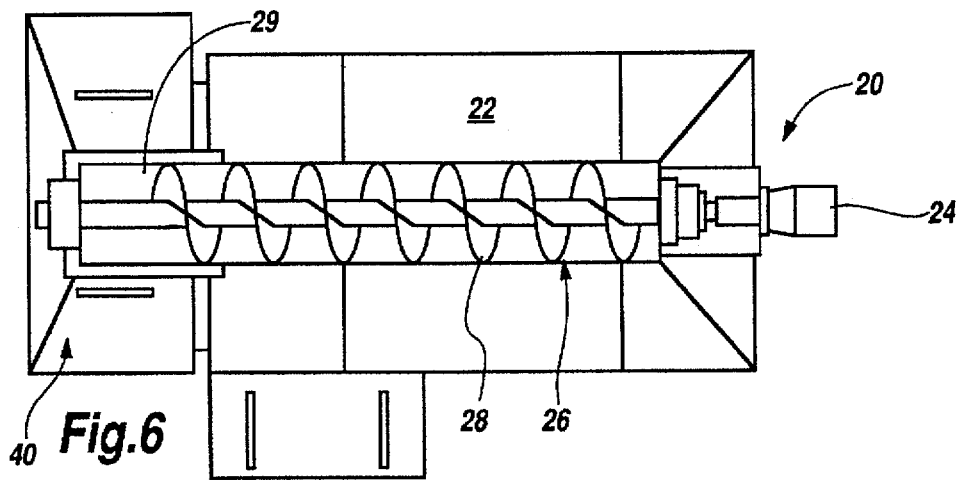
FIG. 6 is a partial top section view of the breading mixture metering hopper and the breading mixture surge hopper taken at section 6—6 of FIG. 5.
Figure 5:
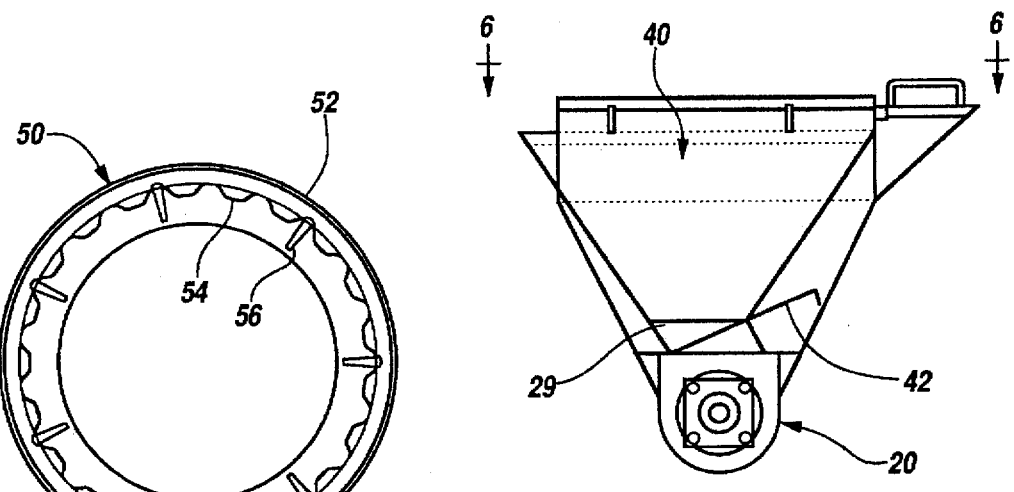
FIG. 5 is a partial side view illustrating a breading mixture, metering hopper and a breading mixture surge hopper of the present invention.

Turning now to FIGS. 3, 5 and 6 therein is illustrated in detail the components of a breading mixture metering hopper 40. Breading mixture is stored in the metering hopper 40 and is dispensed through an adjustable sliding gate 42 for initial charging of the apparatus 10 and continuous make up for the breading mixture leaving with the breaded product out the takeout conveyor 300 (FIG. 1) and lumps removed by the lump removal conveyor 100 (FIG. 1). A vibrator 44 is attached to a sidewall of the hopper 40 to assist with dispensing the breading mixture.

Returning to FIG. 1, breading mixture from the metering hopper 40 is received at a lower end 202 of the recirculation conveyor 200 and is delivered by an auger 210 enclosed in a housing 221 to a discharge chute 240 located at an upper end 204 of the recirculation conveyor 200. The auger 200 is driven by an independently controlled motor 220 located at the lower end 202 of the conveyor. The breading mixture is discharged from the upper end of the conveyor and flows down the discharge chute 240 into the breading drum 50. A vibrator 242 located on the discharge chute 240 assists in movement of the breading mixture down the discharge chute 240.

As illustrated in FIGS. 1 and 2, an inlet conveyor 400 delivers product to be breaded to an inlet end 52 of the breading drum 50. The breading mixture has been previously fed into the breading drum 50 from the discharge chute 240. The breading drum 50 is generally 36 inches to 42 inches in diameter and rotates from 3 to 8 revolutions per minute. The speed of rotation is dependent on the desired thickness of the final breaded coating, the nature of the breading mixture and the nature of the product to be breaded. It is noted that liquid is not generally added in the breading drum. The received product to be breaded or other product has enough inherent moisture or retained moisture from prior processing that no additional moisture is needed for adherence of the breading to the product to be breaded. However, it is to be understood that the received product to be breaded or other products could be dipped or sprayed with a liquid prior to entering the breading drum.

As can be seen in FIGS. 1 and 3, the breading drum 50 is supported by the drum cradle assembly 70. The cradle assembly 70 is pivotally mounted at a first end 72 to the apparatus frame 80. The pivotal mounting allows adjustment of the inclination angle from horizontal of the breading drum central axis. The inclination angle and speed of rotation will determine the dwell time of the product to be breaded in the breading drum 50. The inclination angle and rotation time are empirically determined based on the final desired thickness of the breaded coating and the desired throughput rate of breaded product. The apparatus 10 is capable in normal operating ranges of a throughput of approximately 4,000 to 5,000 pounds of product to be breaded per hour. The cradle assembly 70 further includes an independently driven rotation motor 74 connected by belts 75 and 76 to drive rollers 77 and 78. The drive rollers 77 and 78 contact an exterior sidewall 52 of the breading drum 50 and drive the drum 50 by frictional contact. Other prior art drum drive systems may also be used to practice the invention.

Figure 8:
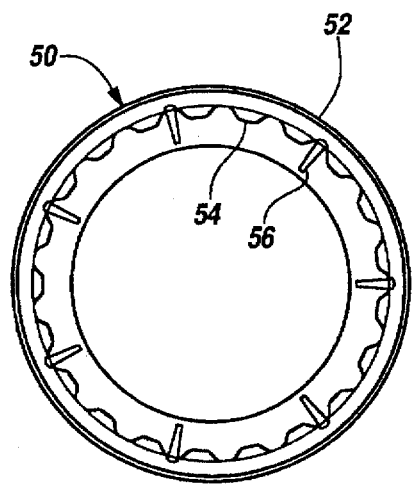
FIG. 8 is a partial end section view of the food breading drum of the present invention taken at section 8—8 of FIG. 7.
Figure 7:
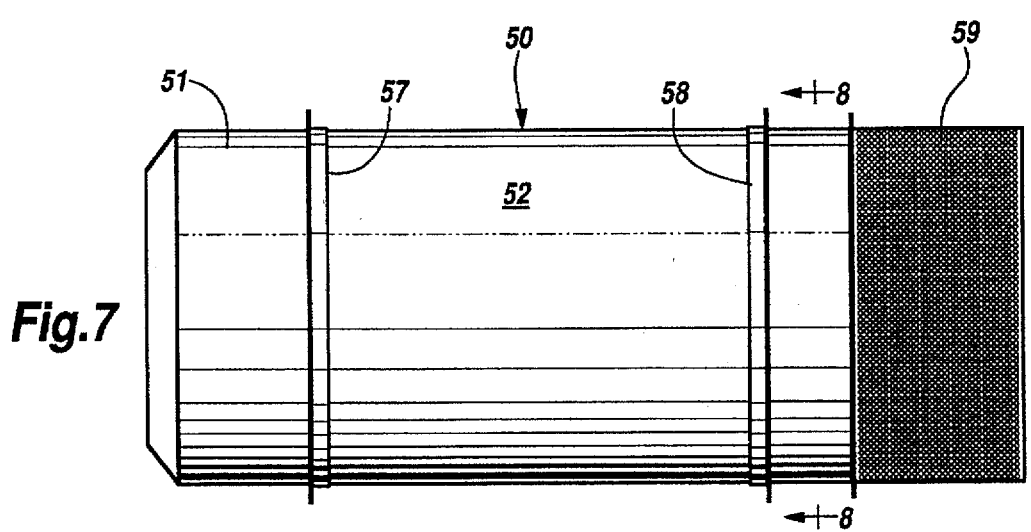
FIG. 7 is a partial top view of a breading drum of the present invention.

Referring to FIGS. 7 and 8, therein is illustrated additional details of the breading drum 50. Shorter ribbed projections 54 are evenly spaced circumferentially around the interior of the drum 50. Interspaced circumferentially among the interior ribbed projections 54 are longer finger projections 56. The size and spacing of the projections 54 and 56 are empirically determined by the size of the primary product to be breaded and a desired tumbling rate inside the breading drum 50.

The product to be breaded and the breading mixture are concurrently inserted into the breading drum 50 at an upper end 51 and are tumbled therein until exiting end 59 as a breaded product that falls onto the takeout conveyor 300.

Returning to FIGS. 1 and 2, therein is illustrated the takeout conveyor 300. An independent motor 310 drives a drive belt 312 that in turn drives a drive shaft 314. Drive sprockets 316 located on the drive shaft 314 in turn drive a continuous belt 320. The continuous belt 320 passes over an idler shaft 318 at the proximal end of the takeout removal conveyor 300. A take out conveyor frame 340 is pivotally mounted at a proximal end 330 to the frame 80. The motor 310 and the drive shaft 314 are supported by the distal end of the rectangular conveyor frame 340 and an idler shaft 318 is supported on the proximal end. The takeout conveyor 300 carries the breaded product to either a fryer or oven for cooking or to a packaging station for wrapping breaded products that are to be shipped to consumers who will fry or bake the breaded product themselves.

Referring again to FIGS. 7 and 8, a pair of exterior support bands 57 and 58 are located circumferentially around the exterior sidewall 52 of the breading drum 50 to provide structural support and rigidity. At the exit end 59, the breading drum 50 is perforated for the lowermost 1 to 1 and ½ feet. As the product to be breaded is tumbled, some of the breading mixture that initially adhered to the product to be breaded becomes detached. Such detached breading mixture may contain moisture from the product to be breaded and as it is tumbled may coagulate to, form lumps. The perforations in the exit end of the drum are sized to allow the lumps and excess breading mixture not adhering to the product to be breaded to pass through the perforations and fall onto the lump removal conveyor located below the perforations. In the present embodiment of the invention, the sidewall 52 of the barrel is perforated by drilling a plurality of holes therein. It is to be understood that other embodiments may include use of woven screen or grating to form the lower end 59 of the barrel and thereby allow the lumps and excess breading mixture to pass therethrough.

As can be seen in FIGS. 1 and 4, a containment shroud 60 is mounted to the upper portion of the breading mixture surge hopper 20 and positioned around the lower end 59 of the breading drum 50 and the lump removal conveyor 100. The shroud 60 serves as a housing for containment of lumps and breading mixture that may pass through the perforations in the drum 50 other than at the bottom of the drum. The shroud 60 contains the lumps and breading mixture and directs the breading mixture and lumps to the underlying lump removal conveyor 100 and the breading mixture surge hopper 20.

Turning now to FIGS. 9, 10 and 11 therein is illustrated the lump removal conveyor 100. An independent motor 110 drives a drive belt 112 that in turn drives a drive shaft 114. Drive sprockets 116 located on the drive shaft 114 in turn drive an open mesh wire belt 120. The continuous belt 120 passes over an idler shaft 118 at the distal end of the lump removal conveyor 100. The lump removal conveyor frame 140 is adjustably mounted on a pair of support guides 130. The support guides 130 are in turn fixably mounted to the inside of the surge hopper 20. The motor 110 and the drive shaft 114 are supported by the proximal end of the rectangular conveyor frame 140 and the idler shaft 118 is supported on the distal end.

The openings in the wire mesh of the lump removal conveyor 100 are smaller than the perforations in the breading drum 50. Breading mixture and lumps pass through the perforations in the breading drum 50 as the breading drum 50 rotates. The breading mixture and lumps fall onto the continuously moving lump removal conveyor belt 120 positioned below the perforated end 59 of the drum 50. Breading mixture sifts through the openings in the wire mesh of the lump removal belt 120 and falls to the breading mixture surge hopper 20 below. The lumps too large to pass through the openings in the belt 120 are carried by the lump removal belt 120 to the catch pan 160 positioned below the proximal end of the belt 120. The catch pan 160 is supported by mounting bracket 162 that is mounted to the frame 80.

Referring to FIGS. 5 and 6 therein is illustrated the breading mixture surge hopper 20. The hopper 20 includes a rectangular, tapered, open topped trough 22. Disposed in the base of the trough is a screw conveyor 26, including an auger 28 and an independent drive motor 24 located at the distal end of the auger 28. Breading mixture falls from the lump removal belt 100 above and is collected in the bottom to the trough 22. The screw conveyor 26 moves the breading mixture to the proximal end of the trough 22 that is positioned below the breading mixture metering hopper 20. A predetermined amount of new breading mixture is fed from the metering hopper 40 above and mixes with the recirculated breading mixture in the trough 22 of the surge hopper 20. The volume of new breading mixture equals the volume of the breading mixture leaving as breading with the product in the take out conveyor and the breading mixture coagulated and collected in the catch pan 160.

Referring to FIGS. 1 and 6, the mixed new and recirculated breading mixture falls through an opening 29 in the bottom of the trough 22 into the bottom end 202 of the recirculation conveyor 200, wherein the cycle heretofore described begins again.

As illustrated in FIGS. 1 and 3, the breading mixture surge hopper 20, the breading drum 50, the containment shroud 60, the drum cradle assembly 70, the frame 80, the lump removal conveyor 100, the recirculation screw conveyor 200, the input conveyor 400, the takeout conveyor 300, and associated drive motors are all supported by the apparatus frame 80 having a plurality of rollers 82 that enable the breading apparatus 10 to be moved as a self contained unit.

It is important to note that the lump removal conveyor 100 working in cooperation with the perforated end 59 of breading drum 50, is one of the most important features of the present invention. If lumps are not removed from the recirculated breading mixture by the lump removal conveyor 100, the lumps will continue to grow in size in successive recirculations by coagulation with additional moist breading mixture that has become disengaged from the product to be breaded. When the lumps reach a size that will not pass thorough the perforations in the lower end 59 of the breading drum 50, they will pass with the breaded product out the end of the breading drum onto the take out conveyor 300 and be transported to the fryer/oven, additional processing stations, or a wrapping station. It is obviously undesirable for lumps of breading to be sold to the consumer with the breaded product.

It is also important to note that the metering hopper contributes to the improved quality and consistency of the breaded product by greatly reducing wide swings in moisture content of the breading mixture, thereby allowing consistent adhesion of the breading to the product and providing an even breading coverage and thickness. In the prior art, two bags of breading mixture, approximately 100 pounds, was added at one time to the prior art breading apparatus. This prior art method of operation created 100 pound surge cycles. The breading mixture was recirculated until additional breading mixture was required. This prior art method of operation created 100 pound surge cycles. The prior art surge cycle manner of operation created breading moisture ranges from dry to sticky clumps, creating non uniform breaded product during each 100 pound surge cycle.

Although the preferred and alternative embodiments of the invention have been illustrated in the accompanying Drawings and described in the foregoing Detailed Description, it will be understood that the invention is not limited to the embodiment disclosed but is capable of numerous modifications without departing from the scope of the invention as claimed.

I claim:

1. A food breading apparatus for breading food components with a breading mixture comprising:

a breading apparatus frame;

a rotatable breading drum including:
   an upper end;
   a lower end;
   an inlet opening located in the upper end,
   an outlet opening located in the lower end,
   a sidewall;
   a longitudinal axis;
   a plurality of openings in the sidewall located proximal to the lower end, said openings of predetermined size to allow surplus breading mixture and lumps of breading mixture to pass therethrough but retain the breaded food product in the breading drum;

means for rotating the breading drum; and means for mounting said breading drum for rotation about its longitudinal axis, said axis inclined from horizontal whereby the upper end is above the lower end;

means for directing food components to be breaded to the inlet opening of the breading drum;

recirculating breading mixture means for providing the breading mixture to the inlet opening;

takeout conveyor means for directing breaded food components away from the outlet opening of the breading drum;

lump removal conveyor means for removing lumps of breading mixture, said means having a plurality of openings of predetermined size to allow passage of surplus breading mixture but retain the lumps of breading mixture for transport to a catch pan;

means supporting the lump removal means beneath the openings in the sidewall of the breading drum; and surge hopper means for collecting and transporting surplus breading mixture to said recirculation means, said means positioned below the lump removal conveyor means thereby collecting surplus breading mixture passing through the openings in the lump removal conveyor means.

2. The food breading apparatus of claim 1 further including:

metering hopper means for storing and dispensing non-recycled breading mixture at a predetermined rate sufficient to equate to the rate breading mixture is leaving the breading apparatus on the breaded products and as the lumps, said metering hopper means mounted on the surge hopper means.

3. The food breading apparatus of claim 2 wherein the metering hopper means includes:

a container;

an inlet opening;

an outlet opening; and adjustable means for dispensing breading mixture.

4. The food breading apparatus of claim 3 wherein the metering hopper means further includes:

means for vibration attached to the container.

5. The food breading apparatus of claim 1 further including:

drum cradle means supporting the breading drum for rotation of the breading drum about the longitudinal axis of the breading drum;

means for pivotally mounting the drum cradle means at a first end to the frame of said breading apparatus allowing for adjustment of the inclination angle of the longitudinal axis of the breading drum from horizontal.

6. The food breading apparatus of claim 5 wherein the drum cradle means includes:

a frame;

a pair of drive rollers driven by the means for 5 rotation of the breading drum, said drive rollers mounted on the breading apparatus frame and supporting and contacting an exterior surface of the sidewall of the breading drum.

7. The food breading apparatus of claim 1 wherein the plurality of openings in the sidewall located proximal to the lower end are formed from a screen mesh.

8. The food breading apparatus of claim 1 wherein the breading recirculating means includes:

a tubular housing inclined from horizontal, said housing having a lower end and an upper end;

an inlet opening in the lower end of the tubular housing;

an outlet opening in the upper end of the tubular housing;

an auger enclosed in the housing;

a means for rotation of the auger; and a discharge chute attached to the upper end of the housing for receiving breading mixture from the outlet opening and directing the breading mixture into the breading drum.

9. The food breading apparatus of claim 8 further including a means for vibration attached to the discharge chute.

10. The breading apparatus of claim 1 wherein the breading drum further includes:

ribbed projections spaced circumferentially on an inside surface of the sidewall of the breading drum.

11. The breading apparatus of claim 1 wherein the takeout conveyor means includes a a rectangular support frame;

a drive shaft mounted on a first end of the support frame;

an idler shaft mounted on a second end of the support frame;

a continuous belt mounted between and around the drive shaft and the idler shaft; and a means for rotation of the drive shaft.

12. The breading apparatus of claim 1 wherein the lump removal conveyor means includes:

a rectangular support frame adjustably mounted to the breading apparatus frame;

a drive shaft mounted on a first end of the support frame;

an idler shaft mounted on a second end of the support frame;

a continuous mesh belt mounted between and around the drive shaft and the idler shaft;

a means for rotation of the drive shaft; and a catch pan for receiving and holding lumps.

13. The breading apparatus of claim 1 wherein the surge hopper means includes:

an open top trough;

an auger disposed in the bottom of the trough;

means for turning the auger;

an opening located in the bottom of the trough for passing recirculated breading mixture to the recirculation breading mixture means.

14. The breading apparatus of claim 1 further including a containment shroud attached to the surge hopper means and positioned around the lower end of the breading drum and lump removal conveyor, said shroud comprising:

a housing:

an opening in a first side for receiving the lower end of the breading drum; and an opening in a bottom side for passing breading mixture to the underlying surge hopper.

* * * * *

UNITED STATES PATENT AND TRADEMARK OFFICE
CERTIFICATE OF CORRECTION

PATENT NO. : 5,664,489
DATED : September 9, 1997
INVENTOR(S) : Harold Herrick, IV It is certified that error appears in the above-identified patent and that said Letters Patent is hereby corrected as shown below:

On the first page under Assignee, please replace "Dallas A.C. Horn & Co." with --Dallas A.C. Horn & Co., D/B/A A.C. Horn & Co.--.

In Column 4, line 61, please delete the "," after the word "to".

In Claim 6, line 51, please delete "5" after the word "for".

Signed and Sealed this

Tenth Day of March, 1998

Attest:

BRUCE LEHMAN

Attesting Officer

Commissioner of Patents and Trademarks